(12) United States Patent
Park et al.

(10) Patent No.: US 12,294,868 B2
(45) Date of Patent: May 6, 2025

(54) METHOD OF BUILDING AD-HOC NETWORK OF WIRELESS RELAY NODE AND AD-HOC NETWORK SYSTEM

(71) Applicants: Ewha University—Industry Collaboration Foundation, Seoul (KR); Foundation of Soongsil University-Industry Cooperation, Seoul (KR)

(72) Inventors: Hyunggon Park, Seoul (KR); Nayoung Kim, Gyeonggi-do (KR); Minhae Kwon, Seoul (KR)

(73) Assignees: Ewha University—Industry Collaboration Foundation, Seoul (KR); Foundation of Soongsil University-Industry Cooperation, Seoul (KR)

( * ) Notice: Subject to any disclaimer, the term of this patent is extended or adjusted under 35 U.S.C. 154(b) by 480 days.

(21) Appl. No.: 17/662,570

(22) Filed: May 9, 2022

(65) Prior Publication Data

US 2023/0109333 A1    Apr. 6, 2023

(30) Foreign Application Priority Data

Oct. 1, 2021    (KR) .................. 10-2021-0131014

(51) Int. Cl.
*H04W 16/18*    (2009.01)
*H04W 40/22*    (2009.01)
(Continued)

(52) U.S. Cl.
CPC .......... *H04W 16/18* (2013.01); *H04W 40/22* (2013.01); *H04W 40/246* (2013.01); *H04W 84/18* (2013.01)

(58) Field of Classification Search
CPC ...... Y02D 30/70; H04W 40/24; H04W 40/22; H04W 84/18; H04W 16/18
See application file for complete search history.

(56) References Cited

U.S. PATENT DOCUMENTS 7,519,045 B2 *   4/2009   Kim ................... H04L 12/2854
                                                      370/315
8,284,788 B2 *  10/2012   Westphal ............... H04L 45/48
                                                      370/254
(Continued)

FOREIGN PATENT DOCUMENTS

| KR | 20140103797 A | 8/2014 |
| KR | 101512928 B1 | 4/2015 |
| KR | 102063643 B1 | 1/2020 |

OTHER PUBLICATIONS

Sun, Y., Lin, Y., Tang, Y. (2019). A Reinforcement Learning-Based Routing Protocol in VANETs. In: Liang, Q., Mu, J., Jia, M., Wang, W., Feng, X., Zhang, B. (eds) Communications, Signal Processing, and Systems. CSPS 2017. Lecture Notes in Electrical Engineering, vol. 463. Springer, Singapore. (Year: 2019).*

(Continued)

*Primary Examiner* — Khaled M Kassim
*Assistant Examiner* — Christopher A. Reyes
(74) *Attorney, Agent, or Firm* — Inskeep IP Group, Inc.

(57) ABSTRACT

A method of building an ad-hoc network of a wireless relay node and an ad-hoc network system are disclosed. The method includes verifying state information representing a relative distance and angle to a neighboring node capable of receiving data when each of relay nodes transmits the data, determining an action representing a change over time of each relay node, determining, based on an amount of change in a network throughput determined according to the state information and an amount of energy consumption according to the action, a reward corresponding to the action, and (Continued)

building a network including a source node, a destination node, and a plurality of relay nodes by generating, based on a reward of each of the relay nodes, a policy that allows a cumulative reward to be maximized.

11 Claims, 4 Drawing Sheets

(51) Int. Cl.
*H04W 40/24* (2009.01)
*H04W 84/18* (2009.01)

(56) References Cited

U.S. PATENT DOCUMENTS

| | | | | |
|---|---|---|---|---|
| 9,078,121 | B2* | 7/2015 | Georgescu | H04W 4/08 |
| 9,578,530 | B2* | 2/2017 | Gopalakrishnan | H04W 16/18 |
| 10,218,777 | B2* | 2/2019 | Pistoia | H04L 67/10 |
| 10,382,979 | B2* | 8/2019 | Tan | H04W 24/02 |
| 10,694,526 | B2* | 6/2020 | Nguyen | H04W 72/541 |
| 2004/0121786 | A1* | 6/2004 | Radcliffe | G01V 1/003 |
| | | | | 455/500 |
| 2014/0113600 | A1* | 4/2014 | El Gamal | H04W 28/02 |
| | | | | 455/414.3 |
| 2019/0156197 | A1* | 5/2019 | Dasgupta | G06N 3/08 |
| 2021/0058936 | A1* | 2/2021 | Gordaychik | H04W 72/23 |
| 2021/0111988 | A1* | 4/2021 | Plate | H04L 45/08 |

OTHER PUBLICATIONS

Dong, Shaoqiang, Prathima Agrawal and Krishna M. Sivalingam. "Reinforcement Learning Based Geographic Routing Protocol for UWB Wireless Sensor Network." IEEE Globecom 2007—IEEE Global Telecommunications Conference (2007): 652-656. (Year: 2007).*

Tolba, Fatiha Djemili, Damien Magoni and Pascal Lorenz. "Energy Saving and Connectivity Tradeoff by Adaptative Transmission Range in 802.11g MANETs." 2006 International Conference on Wireless and Mobile Communications (ICWMC'06) (2006): 45-45. (Year: 2206).*

Kwon, M. et al., "Intelligent IoT Connectivity: Deep Reinforcement Learning Approach," *IEEE Sensors Journal*, vol. 20, No. 5, Mar. 1, 2020, pp. 2782-2791, 10 pages.

Le, T.T.T. et al., "Reinforcement-Learning-Based Topology Control for Wireless Sensor Networks," *Advanced Science and Technology Letters*, vol. 142 (GDC 2016), Dec. 2016, pp. 22-27, 7 pages.

Kim Ki-Sang, "Equal Energy Consumption Routing Protocol Algorithm based on Q-Learning for extending the Lifespan of Ad-Hoc Sensor Network," *Creative Commons Deed*, Sogang University Graduate School, Department of Computer Engineering, master's thesis in engineering submitted Dec. 21, 2020, 56 pages.

\* cited by examiner

METHOD OF BUILDING AD-HOC NETWORK OF WIRELESS RELAY NODE AND AD-HOC NETWORK SYSTEM

RELATED APPLICATIONS

This application claims the benefit of Korean Patent Application No. 10-2021-0131014 filed on Oct. 1, 2021, in the Korean Intellectual Property Office, the entire disclosure of which is incorporated herein by reference for all purposes.

BACKGROUND

1. Field of the Invention

One or more example embodiments relate to a method and apparatus for building an ad-hoc network, and more particularly, to a method and apparatus for building an ad-hoc network system that reduces energy consumption of an entire network while maintaining a high network throughput in the network including moving wireless relay nodes.

2. Description of the Related Art

The number of mobile devices is continuously increasing. With the recent entry into a hyper-connected society between devices, the importance of a wireless network is growing. In the meantime, a centralized network has solved an explosive increase in Internet demand through the expansion of a base network. However, as the expansion of network infrastructure reaches a limit and a IoT paradigm is presented, a distributed network, led by a device-to-device network, is emerging as a new solution.

In the distributed network, communication and control functions are performed by a plurality of individual nodes that are interconnected. A representative example is a mobile ad-hoc network (MANET). The MANET is capable of configuring an ad-hoc network in which a mobile node autonomously receives and transmits data from relay nodes, and transmits data from a source node to a destination node.

However, the MANET has a limitation in that it is difficult to maintain a stable network throughput. This is because environmental dynamics may increase due to relay node information including position information that changes in real time, and accordingly connectivity between nodes may become unstable. In addition, an energy source of a node is limited to a battery, and thus efficient energy use is important. Each relay node needs to use standby power, power required for movement, and power required for communication within a given battery capacity. Finally, as the number of nodes increases, real-time collection of all node information becomes difficult. In addition, a process of collecting node information consumes communication power, and thus an issue associated with energy consumption may be exacerbated.

Accordingly, there is a demand for a network building method that reduces energy consumption of an entire network while maintaining a network throughput.

SUMMARY

Example embodiments provide a method and apparatus for building an ad-hoc network system that reduces energy consumption of an entire network while maintaining a high network throughput even when positions of relay nodes change by collecting, by each of the relay nodes, state information and repeating learning for determining an action and a reward.

According to an aspect, there is provided a method of building an ad-hoc network, the method including verifying state information representing a relative distance and angle to a neighboring node capable of receiving data when each of relay nodes transmits the data, determining, based on the state information, an action representing a change over time of each relay node, determining, based on an amount of energy consumption according to the action and an amount of change in a network throughput determined according to the state information changed according to the action, a reward corresponding to the action, and building a network including a source node, a destination node, and a plurality of relay nodes by generating, based on a reward of each of the relay nodes, a policy that allows a cumulative reward to be maximized.

The verifying of the state information may include defining, as a neighboring node of each of the relay nodes, another relay node having a Euclidean distance to each of the relay nodes shorter than a transmission range radius of each of the relay nodes, or a destination node, and determining, as the state information, the number of neighboring nodes.

The action may include a changed transmission range radius, a moved distance, and a rotated angle, at a time t, when compared to a previous time t−1.

The method may further include changing a transmission range of each of the relay nodes according to a transmission range radius at a previous time and a transmission range radius at a current time, and determining whether the changed transmission range is greater than a changeable range. The determining of the reward may be performed when the changed transmission range is less than or equal to the changeable range, and the determining of the action may be re-performed when the changed transmission range is greater than the changeable range.

The changing of the transmission range radius may include increasing a transmission range of a relay node according to a difference between the transmission range radius at the current time and the transmission range radius at the previous time when the difference between the transmission range radius at the current time and the transmission range radius at the previous time is greater than 0, reducing the transmission range of the relay node according to the difference between the transmission range radius at the current time and the transmission range radius at the previous time when the difference between the transmission range radius at the current time and the transmission range radius at the previous time is less than 0, and maintaining the transmission range of the relay node when the transmission range radius at the current time and the transmission range radius at the previous time are equal.

The determining of the reward may include determining the reward by applying a balance coefficient that gives a weight to each of the amount of change in the network throughput and the amount of energy consumption according to the action.

According to another aspect, there is provided an ad-hoc network system including relay nodes configured to verify state information representing a relative distance and angle to a neighboring node capable of receiving data when the data is transmitted. The relay nodes may be configured to determine, based on the state information, an action representing a change over time of each relay node, determine, based on an amount of energy consumption according to the action and an amount of change in a network throughput determined according to the state information changed according to the action, a reward corresponding to the action, and build a network including a source node, a destination node, and a plurality of relay nodes by generating, based on the reward, a policy that allows a cumulative reward to be maximized.

Additional aspects of example embodiments will be set forth in part in the description which follows and, in part, will be apparent from the description, or may be learned by practice of the disclosure.

According to example embodiments, it is possible to build an ad-hoc network system that reduces energy consumption of an entire network while maintaining a high network throughput even when positions of relay nodes change by collecting, by each of the relay nodes, state information and repeating learning for determining an action and a reward.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

In addition, when describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

Figure 1:
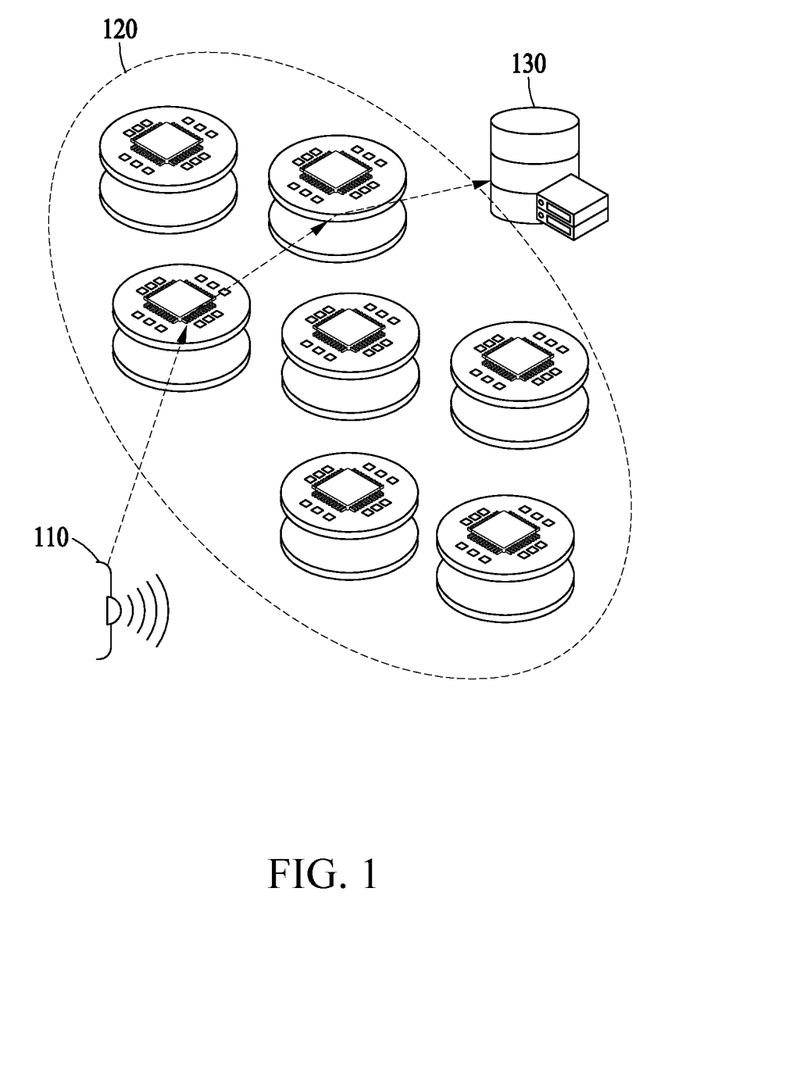
FIG. 1 is a diagram illustrating an ad-hoc network system that is built according to an example embodiment.

FIG. 1 is a diagram illustrating an ad-hoc network system that is built according to an example embodiment.

The ad-hoc network system may be modeled with a directed graph $G_t$ from a source node 110 to a destination node 130 at a time t, and may include all nodes including the source node 110, relay nodes 120, and the destination node 130. In addition, the number of all nodes may be defined as M.

In addition, a distance between the source node 110 and the destination node 130 may be a distance at which data may not be transmitted to the destination node 130 through a transmission output of the source node 110. Thus, in the ad-hoc network system, a network may be configured in an ad-hoc form in which data transmitted from the source node 110 is transmitted to the destination node 130 through the relay node 120.

In this case, the relay nodes 120 may relay the data transmitted from the source node 110 to the destination node 130. For example, the relay node 120 may be defined as $N(G_t)=\{n_i, i=0, 1, \ldots M-3\}$, and the number of relay nodes 120 may be $|N(G_t)|$.

In addition, the relay nodes 120 may be mobile nodes capable of performing wireless communication and moving randomly at regular intervals or in real time.

Each of the relay nodes 120 may learn transmission power required for data transmission through interaction with an environment (network), based on Q-learning that is a type of reinforcement learning. In this case, a learning goal of the relay node 120 may be to maintain a high network throughput and reduce an average amount of energy consumption.

Specifically, when each of the relay nodes 120 transmits data, each of the relay nodes 120 may verify state information representing a relative distance and angle to a neighboring node capable of receiving data. In this case, the relay node 120 may define, as a neighboring node of the relay node 120, another relay node having a Euclidean distance to the relay node 120 shorter than a transmission range radius of the relay node 120, or a destination node. In addition, the relay node 120 may determine the number of neighboring nodes as state information of the relay node 120.

Subsequently, the relay node 120 may determine, based on the verified state information, an action representing a change over time of each relay node. In this case, the action may include a changed transmission range radius $\delta_{i,t}$, a moved distance $l_{i,t}$ ($0 \leq l_{i,t} \leq l_{max}$), and a rotated angle $\theta_{i,t}$ ($0 \leq \theta_{i,t} < 2\pi$), at the time t, when compared to a previous time t−1.

In addition, the relay node 120 may change a transmission range of the relay node 120 according to a transmission range radius at a previous time and a transmission range radius at a current time. When a difference between the transmission range radius at the current time and the transmission range radius at the previous time is greater than 0, the relay node 120 may increase the transmission range of the relay node 120 according to the difference between the transmission range radius at the current time and the transmission range radius at the previous time. In addition, when the difference between the transmission range radius at the current time and the transmission range radius at the previous time is less than 0, the relay node 120 may reduce the transmission range of the relay node 120 according to the difference between the transmission range radius at the current time and the transmission range radius at the previous time. In addition, when the transmission range radius at the current time and the transmission range radius at the previous time are equal, the relay node 120 may maintain a transmission range thereof.

In addition, the relay node 120 may determine whether the changed transmission range is greater than a changeable range. When the changed transmission range is greater than the changeable range, the relay node 120 may re-determine the action.

Subsequently, the relay node 120 may determine, based on an amount of energy consumption according to the action and an amount of change in a network throughput determined according to the state information changed according to the action, a reward corresponding to the action. In this case, an operation of determining a reward may be performed when the changed transmission range is less than or equal to the changeable range. In addition, the relay node 120 may determine the reward by applying a balance coefficient that gives a weight to each of the amount of change in the network throughput and the amount of energy consumption according to the action. For example, the amount of energy consumption may include energy consumption according to a transmission range radius change, and energy consumption according to a position change.

Finally, the relay node 120 may build a network including a source node, a destination node, and a plurality of relay nodes by generating, based on a reward of each of the relay nodes, a policy that allows a cumulative reward to be maximized.

The ad-hoc network system may build a network that reduces energy consumption of an entire network while maintaining a high network throughput even when positions of the relay nodes 120 change by collecting, by each of relay nodes 120, state information and repeating learning for determining an action and a reward.

Figure 2:
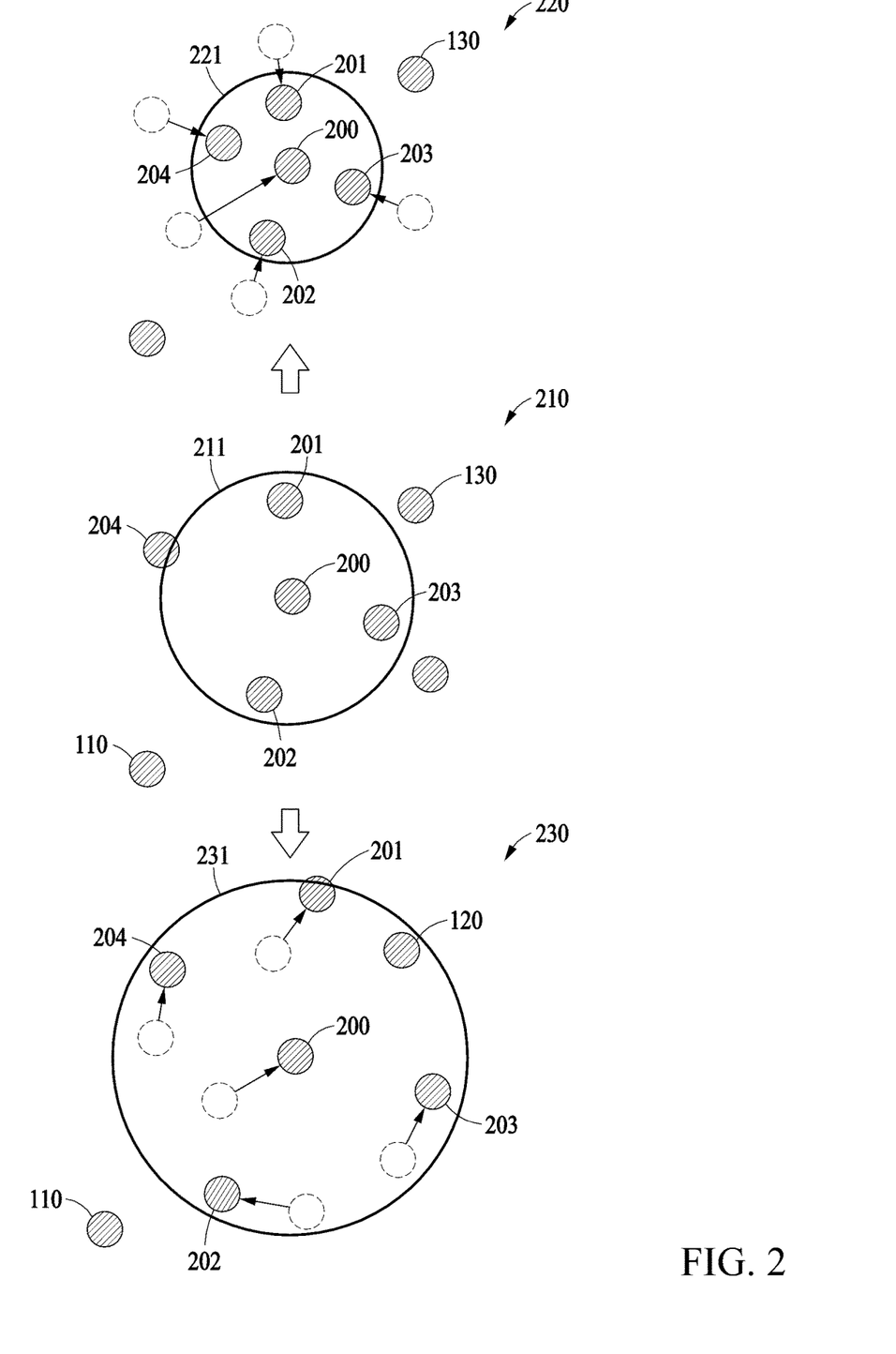
FIG. 2 is an example of a change in a transmission range of a relay node in a process of building an ad-hoc network according to an example embodiment.

FIG. 2 is an example of a change in a transmission range of a relay node in a process of building an ad-hoc network according to an example embodiment.

In operation 210, the relay node 200 may transmit data to other relay nodes 201, 202, 203, and 204 positioned within a transmission range 211 at a time t−1. In addition, at a time t, the relay node 200 may verify a difference between a transmission range radius at the time t and a transmission range radius at the time t−1. When the difference between the transmission range radius at the time t and the transmission range radius at the time t−1 is less than 0, the relay node 200 may perform operation 220. In addition, when the difference between the transmission range radius at the time t and the transmission range radius at the time t−1 is greater than 0, the relay node 120 may perform operation 230. In addition, when the transmission range radius at the time t and the transmission range radius at the time t−1 are equal, the relay node 200 may maintain a state of operation 210.

Figure 3:
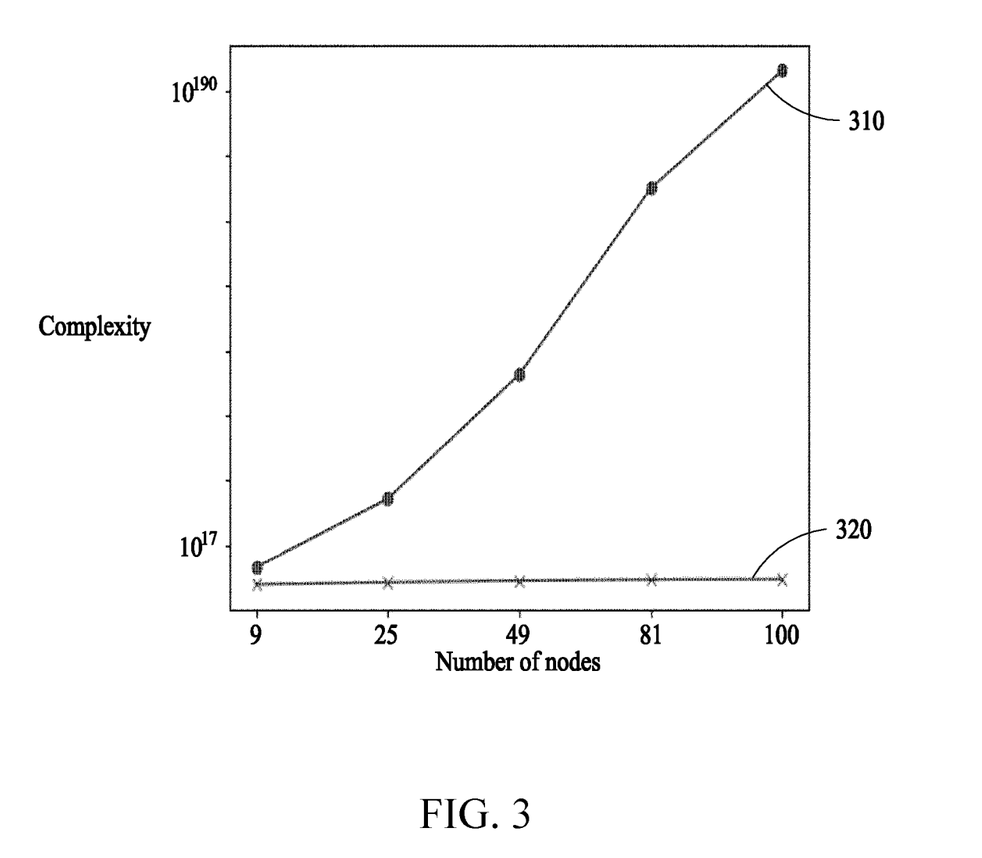
FIG. 3 is an example of a computational complexity comparison between a method of building an ad-hoc network and a method according to a related art according to an example embodiment.

In operation 220, the relay node 200 may reduce a transmission range of a relay node according to the difference between the transmission range radius at the time t and the transmission range radius at the time t−1. For example, as illustrated in FIG. 3, when a distance between the other relay nodes 201, 202, 203, and 204 and the relay node 200 is reduced due to movement of the other relay nodes 201, 202, 203, and 204, the relay node 200 may transmit data to the other relay nodes 201, 202, 203, and 204 even when the transmission range radius at the time t is reduced. Accordingly, the relay node 200 may determine the transmission range radius at the time t such that the transmission range radius at the time t is reduced rather than the transmission range radius at the time t−1 within a range in which state information representing a relative distance and angle to a neighboring node capable of receiving data is maintained.

In operation 230, as illustrated in FIG. 2, the relay node 200 may increase the transmission range of the relay node 120 according to the difference between the transmission range radius at the time t and the transmission range radius at the time t−1. For example, as illustrated in FIG. 2, when the distance between the other relay nodes 201, 202, 203, and 204 and the relay node 200 is increased due to the movement of the other relay nodes 201, 202, 203, and 204, the relay node 200 may not transmit data to the other relay nodes 201, 202, 203, and 204 when the transmission range radius at the time t−1 is maintained. Accordingly, the relay node 200 may determine the transmission range radius at the time t such that the transmission range radius at the time t is increased rather than the transmission range radius at the time t−1, thereby allowing the data to be transmitted to the other moving relay nodes 201, 202, 203, and 204.

FIG. 3 is an example of a computational complexity comparison between a method of building an ad-hoc network and a method according to a related art according to an example embodiment.

A centralized method used in a method of building an ad-hoc network according to a related art may be a method for finding an optimal network topology by putting an entire network in a search range. In this case, each relay node may be connected to all other relay nodes.

In addition, a computational complexity when a network is built may be proportional to a search space. In addition, the search space may be defined as the total number of combinations of possible node connections. The total number of nodes may be k, and thus k connections may be possible for each node when the centralized method is applied. Accordingly, the maximum number of combinations of possible connections may be $M^M$, and thus a computational complexity 310 may be $O(M^M)$.

Conversely, in a method of building an ad-hoc network according to an example embodiment, each node may have a maximum of k−1 neighboring nodes, and a size of an action space for each node may be |A|. Accordingly, in the method of building an ad-hoc network according to an example embodiment, the maximum number of possible combinations may be M(M−1)|A|. In the case of |A|<M, a computational complexity 320 may be $O(M^2)$.

Figure 4:
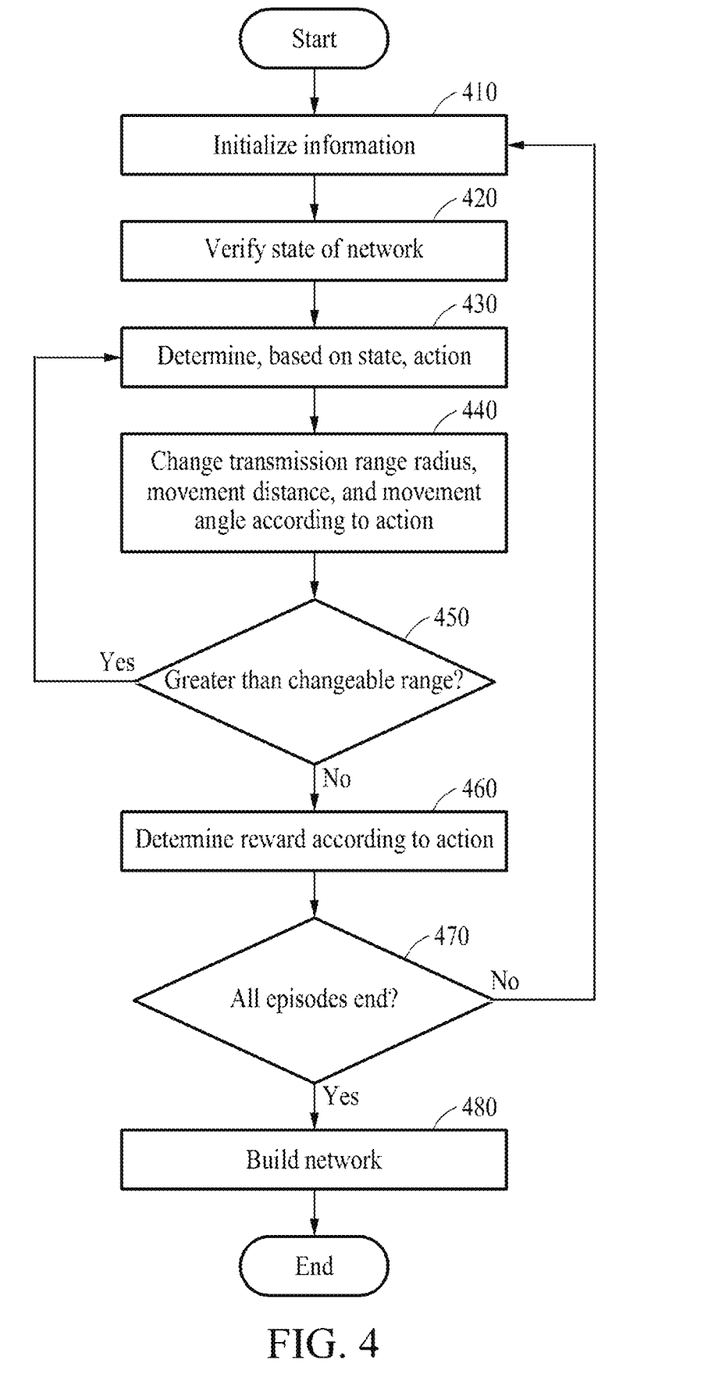
FIG. 4 is a flowchart illustrating a method of building an ad-hoc network according to an example embodiment.

As illustrated in FIG. 4, a computational complexity 410 of the method of building an ad-hoc network using the centralized method according to a related art may increase exponentially as the total number of nodes included in the network increases, unlike a computational complexity 420 of the method of building an ad-hoc network according to an example embodiment. Accordingly, the method of building an ad-hoc network according to an example embodiment may have a lower computational complexity than that of the method of building an ad-hoc network according to a related art.

FIG. 4 is a flowchart illustrating a method of building an ad-hoc network according to an example embodiment.

In operation 410, the relay node 120 may initialize information to be used for learning for building an ad-hoc network. Specifically, the relay node 120 may initialize state information, an action, and a reward.

In operation 420, state information of a network of relay nodes 120 may be verified. In this case, when a relay node $n_i$ transmits data at a time t, state information $s_{i,t} \in S$ may be a set of a relative Euclidean distance $d_{i,t}(j)$ between a neighboring node $n_j$ capable of receiving the data transmitted by the relay node $n_i$ and the relay node $n_i$, and an angle $\psi_{i,t}(j)$ between the neighboring node $n_j$ and the relay node $n_i$. In this case, j may be $0 \leq j < M-1$ ($i \neq j$). In addition, when a transmission range $\delta_{i,t}$ is less than the relative Euclidean distance $d_{i,t}(j)$ between the neighboring node $n_j$ and the relay node $n_i$, state information on the neighboring node $n_j$ may not exist.

In operation 430, the relay node 120 may determine, based on the state information determined in operation 420, an action representing a change over time of each relay node. In this case, the action $a_{i,t} \in A$ may include a changed transmission range radius $\delta_{i,t}$, a moved distance $l_{i,t}$, and a rotated angle $\theta_{i,t}$ at a time t, when compared to a previous time t−1. In this case, a size of an entire action space may be |A|, and the action may be represented by Equation 1.

$$a_{i,t} = \{\delta_{i,t}, l_{i,t}, \theta_{i,t}\} \quad [\text{Equation 1}]$$

In addition, a distance moved by the relay node 120 at the time t may be $l_{i,t}$ ($0 \leq l_{i,t} \leq l_{max}$). In addition, a function F may represent an amount of transmission energy consumption according to a transmission range radius change, and a function H may represent an amount of energy consumption according to a movement distance. In addition, an action $a_{i,t} \in A$ may be a combination of a distance $l_{i,t}$ ($0 \leq l_{i,t} \leq l_{max}$) moved by the node $n_i$ at the time t and an angle $\theta_{i,t}$ ($0 \leq \theta_{i,t} < 2\pi$) at which the node $n_i$ rotates. Accordingly, when a position of the node $n_i$ at the time t is $(x_{i,t}, y_{i,t})$, a position of the node $n_i$ at a time t+1 may be as illustrated in Equation 2.

$$(x_{i,t+1}, y_{i,t+1}) = (l_{i,t} \times \cos \theta_{i,t} + x_{i,t}, l_{i,t} \times \sin \theta_{i,t} + y_{i,t}) \quad [\text{Equation 2}]$$

In operation 440, the relay node 120 may change at least one of a transmission range, a movement distance, and a movement angle of the relay node 120 according to a transmission range radius at a previous time and a transmission range radius at a current time.

For example, in the case of $|\delta_{i,t} - \delta_{i,t-1}| > 0$, the relay node 120 may expand the transmission range by $|\delta_{i,t} - \delta_{i,t-1}|$. In addition, in the case of $|\delta_{i,t-1} - \delta_{i,t-1}| < 0$, the relay node 120 may reduce the transmission range by $|\delta_{i,t} - \delta_{i,t-1}|$. In addition, in the case of $|\delta_{i,t} - \delta_{i,t-1}| = 0$, the relay node 120 may maintain the transmission range at the previous time t−1.

In addition, the relay node 120 may change the movement distance and the movement angle of the relay node 120 to move to a position determined according to Equation 2 until the time t+1.

In operation 450, the relay node 120 may determine whether the transmission range changed in operation 440 is greater than a changeable range. When the changed transmission range is greater than the changeable range, the relay node 120 may perform operation 430 to re-determine the action. In addition, when the changed transmission range is less than or equal to the changeable range, the relay node 120 may perform operation 460.

In operation 460, the relay node 120 may determine, based on an amount of energy consumption according to the action and an amount of change in a network throughput determined according to the state information changed according to the action, a reward corresponding to the action.

In addition, as illustrated in Equation 3, a reward $r_{i,t} \in R$ of the relay node 120 may be expressed as a reward function including a reward term and a penalty term.

$$r_{i,t}(s_{i,t}, a_{i,t}) = k \times \phi(s_{i,t}) + \omega_t \times F(s_{i,t}) - (1-\omega_t) \times G(a_{i,t-1}) \quad [\text{Equation 3}]$$

In this case, as illustrated in Equation 3, the reward term may be a sum of a network throughput $\phi(s_{i,t})$ and a function $F(s_{i,t})$ of a Euclidean distance and angle to a neighboring node per unit transmission range, a coefficient $\omega_t$ may be a weight of the penalty term, and a constant k may be a weight of the network throughput.

In addition, the network throughput $\phi(s_{i,t})$ may be an amount of data transmitted per unit time. $\phi(s_{i,t}) > 0$ may refer to a connection made between a source node and a destination node. In addition, $F(s_{i,t})$ may be defined by Equation 4.

$$F(s_{i,t}) = \frac{\sum_{j=0}^{|H_{i,t}|} d_{i,t}(j)}{|H_{i,t}| \times \delta_{i,t}} + \frac{\sum_{j=0}^{|H_{i,t}|} \psi_{i,t}(j)}{|H_{i,t}| \times 180°} \quad [\text{Equation 4}]$$

In this case, each term of $F(s_{i,t})$ may have a value close to 1 as a distance $d_{i,t}(j)$ to a neighboring node is closer to a transmission range $\delta_{i,t}$. In addition, as an angle $\psi_{i,t}(j)$ to the neighboring node is closer to 180 degrees, each term of $F(s_{i,t})$ may have a value close to 1. Accordingly, each term of $F(s_{i,t})$ having a value closer to 1 may refer to a node position optimized according to a transmission range.

In addition, $F(s_{i,t})$ may serve to encourage movement of a relay node. In this case, $|H_{i,t}|$ may represent the number of neighboring nodes. In addition, the penalty term may be an amount of energy consumption $G(a_{i,t-1}) = G(\delta_{i,t-1}, l_{i,t-1}, \theta_{i,t-1})$ according to an action. Accordingly, an agent may be trained in a direction of reducing energy consumption and improving a network throughput. In addition, a coefficient $\omega_t$, which is a weight related to $F(s_{i,t})$ and a penalty term $G(a_{i,t-1})$, may be linearly increased with progress of learning to accelerate convergence of a relay node position.

In operation 470, the relay node 120 may verify whether all episodes end. When all the episodes end, the relay node 120 may perform operation 480. In addition, when there is an unended episode, operation 410 may be performed to initialize a state and action, a network throughput, and a position of the relay node 120 whenever a new episode starts.

In operation 480, the relay node 120 may generate, based on a reward of each of relay nodes, a policy $\pi^*$ that allows a cumulative reward to be maximized to build a network including a source node, a destination node, and a plurality of relay nodes. In this case, the policy may be a method for determining, based on state information, an optimal action. The relay node 120 may use Q-learning among reinforcement learning algorithms so as to solve an MDP problem. Accordingly, the optimal action determined by the relay node 120 may be defined as an action having a maximum Q-function value in each state information. In this case, the Q-function value may be derived by a Q-function, and the Q-function may average a cumulative compensation value reduced by a discount factor ($0 \leq \gamma < 1$) every time t according to the policy $\pi$. In this case, the discount factor may be a coefficient that balances a current reward with a future reward, and may refer to a value of the future reward that is highly valued as it is closer to 1. For example, a discount factor $\gamma$ may be 0.9.

In addition, when learning is continued until time $t_{end}$, a Q-function of an i-th relay node $n_i$ at the time t may be represented by Equation 5.

$$Q_i^\pi(s, a) = E_\pi\left[\sum_{\tau=t+1}^{t_{end}} \gamma^{\tau-t-1} r_{i,\tau} \mid s_{i,t} = s, a_{i,t} = a\right] \quad [\text{Equation 5}]$$

In addition, when learning continues until time $t_{end}$, an optimal action a* of the i-th relay node $n_i$ at the time t may be represented by Equation 6.

$$a^* = \pi^*(s) = \mathrm{argmax}_a Q_i^{\pi*}(s,a) \qquad \text{[Equation 6]}$$

The relay node 120 may perform learning by applying a tabular-Q method. For example, a pseudo code of an entire learning method may be as illustrated in Algorithm 1.

| Algorithm 1 Q-learning Based Ad-Hoc Network Formation |
| --- |
| Require node set N($G_t$). action set A, Q-table Q. greedy rate ∈ |
| 1:  for episode = 0, 1, . . ., $T_{end}$ do |
| 2:    for all $n_{i,t} \in N(G_t)$ do |
| 3:      Initialize [$x_{i,0}$, $y_{i,0}$] |
| 4:      $\delta_{i,0}$ = 0, $s_{i,1}$ = 0, $\phi_{i,0}$ = 0 |
| 5:    end for |
| 6:    for step = 1, 2, . . ., $t_{end}$ do |
| 7:      for all $n_{i,t} \in N(G_t)$ do |
| 8:        $a_{i,t}$ ← Get_Action( $s_{i,t}$, ∈, A, $\delta_{i,t}$ ) |
| 9:        $\delta_{i,t}$ ← $\delta_{i,t-1}$ |
| 10:       [$x_{i,t+1}$, $y_{i,t+1}$] ← [$x_{i,t}$ +$l_{i,t}$cos$\theta_{i,t}$, $y_{i,t}$ +$l_{i,t}$sin$\theta_{i,t}$] |
| 12:       Transmit data |
| 12:       Update_Q_table( $s_{i,t}$, $a_{i,t}$, $r_t$, $s_{i,t+1}$ ) |
| 13:     end for |
| 14:   end for |
| 15: end for |

In addition, the relay node 120 may determine an action through an ε-greedy method using Algorithm 2.

| Algorithm 2 ∈-greedy Action Selection of Node $n_{i,t}$ |
| --- |
| 1:  function Get_Action( $s_{i,t}$, ∈, A, $\delta_{i,t}$ ) |
| 2:    Generate random variable p ~ U(0,1) |
| 3:    if p < ∈ then |
| 4:      Randomly select $a_{i,t} \in A$ |
| 5:    else: |
| 6:      $a_{i,t}$ ← $\mathrm{argmax}_a Q_i^\pi(s_{i,t}, a_i)$ |
| 7:    return $a_{i,t}$ |

In this case, the tabular-Q method may generate a Q-table including Q(s, a) for each relay node 120 to use the policy illustrated in Equation 5. In addition, learning may refer to a process of completing the Q-table by observing, by all relay nodes 120, a state according to an action, and calculating Q(s, a). A learning process may be repeated until the preset number of episodes is over. Whenever a new episode starts, operation 410 may be performed to initialize a state and action, a network throughput, and a position of the relay node 120. In addition, one episode may include multiple steps, such as operations 410 to 460.

In order for the relay node 120 to learn an optimal policy, the appropriate number of explorations may be required. The relay node 120 may find an optimal action through a search process that attempts various actions in a given state. That is, the relay node 120 may perform learning while repeatedly searching for an action for a current state or determining an action according to a policy. To this end, the relay node 120 may select an action according to the ε-greedy method of Equation 7. In a c-greedy method, an action may be determined according to a policy made with a probability of 1−ε, and the action may be searched according to a uniform probability distribution with a probability of ε.

$$a_{i,t} = \begin{cases} \text{random } (a_i), & \text{with probability } \varepsilon \\ \mathrm{argmax}_a Q_i(s, a), & \text{with probability } 1 - \varepsilon \end{cases} \qquad \text{[Equation 7]}$$

As illustrated in Equation 8, E may be linearly reduced by every episode until $\varepsilon_{min}$ is reached, and search and evaluation may be appropriately performed.

$$\varepsilon = \min(\varepsilon_{min}, 1 - \varepsilon_{decay} \times T), \text{ where } T=0,1,\ldots,T_{end} \qquad \text{[Equation 8]}$$

When the relay node 120 determines the action according to the current state, a network throughput may be calculated, and a reward therefor may be determined. In this case, the relay node 120 may update the Q-table in the form of a linear combination of an existing Q-value and a currently calculated Q-value according to a learning rate, as illustrated in Equation 9. For example, it may be α=0.001.

$$Q_i(s_{i,t-1}, a_{i,t-1}) \leftarrow Q_i(s_{i,t-1}, a_{i,t-1}) + \alpha(r_{i,t} + \gamma \max Q_i(s_{i,t}, a_{i,t}) - Q_i(s_{i,t-1}, a_{i,t-1})) \qquad \text{[Equation 9]}$$

In this case, the Q-table may be a table in which a row is a state and a column is an action, and may store a Q-function value obtained when an action is performed in each state. In addition, the updated Q-table may be used to select an argmax action.

Thereafter, each of all relay nodes 120 may move according to an action within an allocated area.

According to example embodiments, each of relay nodes may collect state information and repeat learning for determining an action and a reward, thereby building an ad-hoc network system that reduces energy consumption of an entire network while maintaining a high network throughput even when positions of the relay nodes change.

The method of building an ad-hoc network according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of building an ad-hoc network, the method comprising:
   verifying state information representing a relative distance and angle to a neighboring node capable of receiving data when each of the relay nodes transmits the data;
   determining, based on the state information, an action representing a change over time of each relay node;
   determining, based on an amount of energy consumption according to the action and an amount of change in a network throughput determined according to the state information changed according to the action, a reward corresponding to the action;
   changing a transmission range of each of the relay nodes according to a transmission range radius at a previous time and a transmission range radius at a current time;
   determining whether the changed transmission range is greater than a changeable range,
   wherein the determining of the reward is performed when the changed transmission range is less than or equal to the changeable range, and the determining of the action is re-performed when the changed transmission range is greater than the changeable range; and
   building a network including a source node, a destination node, and a plurality of relay nodes by generating, based on a reward of each of the relay nodes, a policy that allows a cumulative reward to be maximized.

2. The method of claim 1, wherein the verifying of the state information comprises defining, as a neighboring node of each of the relay nodes, another relay node having a Euclidean distance to each of the relay nodes shorter than a transmission range radius of each of the relay nodes, or a destination node, and determining, as the state information, a distance and angle to the neighboring node.

3. The method of claim 1, wherein the action comprises a changed transmission range radius, a moved distance, and a rotated angle, at a time t, when compared to a previous time t−1.

4. The method of claim 1, wherein the changing of the transmission range radius comprises:
   increasing a transmission range of a relay node according to a difference between the transmission range radius at the current time and the transmission range radius at the previous time when the difference between the transmission range radius at the current time and the transmission range radius at the previous time is greater than 0;
   reducing the transmission range of the relay node according to the difference between the transmission range radius at the current time and the transmission range radius at the previous time when the difference between the transmission range radius at the current time and the transmission range radius at the previous time is less than 0; and
   maintaining the transmission range of the relay node when the transmission range radius at the current time and the transmission range radius at the previous time are equal.

5. The method of claim 1 wherein the determining of the reward comprises determining the reward by applying a balance coefficient that gives a weight to each of the amount of change in the network throughput and the amount of energy consumption according to the action.

6. A non-transitory computer-readable storage medium storing instructions that, when executed by a processor, cause the processor to perform the method of claim 1.

7. An ad-hoc network system comprising:
   relay nodes configured to verify state information representing a relative distance and angle to a neighboring node capable of receiving data when the data is transmitted,
   wherein the relay nodes are configured to:
   determine, based on the state information, an action representing a change over time of each relay node;
   determine, based on an amount of energy consumption according to the action and an amount of change in a network throughput determined according to the state information changed according to the action, a reward corresponding to the action;

change a transmission range of each of the relay nodes according to a transmission range radius at a previous time and a transmission range radius at a current time;

determine whether the changed transmission range is greater than a changeable range;

determine the reward when the changed transmission range is less than or equal to the changeable range; and re-determine the action when the changed transmission range is greater than the changeable range; and build a network including a source node, a destination node, and a plurality of relay nodes by generating, based on the reward, a policy that allows a cumulative reward to be maximized.

8. The ad-hoc network system of claim 7, wherein the relay nodes are configured to:

define, as a neighboring node of each of the relay nodes, another relay node having a Euclidean distance to each of the relay nodes shorter than a transmission range radius of each of the relay nodes, or a destination node; and determine, as the state information, a distance and angle to the neighboring node.

9. The ad-hoc network system of claim 7, wherein the action comprises a changed transmission range radius, a moved distance, and a rotated angle, at a time t, when compared to a previous time t−1.

10. The ad-hoc network system of claim 7, wherein the relay nodes are configured to:

increase a transmission range of a relay node according to a difference between the transmission range radius at the current time and the transmission range radius at the previous time when the difference between the transmission range radius at the current time and the transmission range radius at the previous time is greater than 0;

reduce the transmission range of the relay node according to the difference between the transmission range radius at the current time and the transmission range radius at the previous time when the difference between the transmission range radius at the current time and the transmission range radius at the previous time is less than 0; and maintain the transmission range of the relay node when the transmission range radius at the current time and the transmission range radius at the previous time are equal.

11. The ad-hoc network system of claim 7, wherein the relay nodes are configured to determine the reward by applying a balance coefficient that gives a weight to each of the amount of change in the network throughput and the amount of energy consumption according to the action.

* * * * *